US012056819B2

(12) United States Patent
Mcallister et al.

(10) Patent No.: US 12,056,819 B2
(45) Date of Patent: Aug. 6, 2024

(54) COMPRESSED TRAVERSAL STACK FOR GPU RAY TRACING

(71) Applicant: QUALCOMM Incorporated, San Diego, CA (US)

(72) Inventors: David Kirk Mcallister, Holladay, UT (US); Francois Mathias Robert Demoullin, Vancouver (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/650,066

(22) Filed: Feb. 4, 2022

(65) Prior Publication Data
US 2023/0252726 A1    Aug. 10, 2023

(51) Int. Cl.
*G06T 17/10* (2006.01)
*G06T 9/00* (2006.01)
*G06T 15/06* (2011.01)
*G06T 15/08* (2011.01)

(52) U.S. Cl.
CPC .............. *G06T 17/10* (2013.01); *G06T 9/001* (2013.01); *G06T 15/06* (2013.01); *G06T 15/08* (2013.01); *G06T 2210/21* (2013.01)

(58) Field of Classification Search
None
See application file for complete search history.

(56) References Cited

U.S. PATENT DOCUMENTS

| | | |
|---|---|---|
| 2020/0211268 A1 | 7/2020 | Vaidyanathan et al. |
| 2021/0287431 A1 | 9/2021 | Woop et al. |
| 2022/0051476 A1* | 2/2022 | Woop .................. G06T 3/4007 |

OTHER PUBLICATIONS

Benthin C., et al., "Compressed-Leaf Bounding vol. Hierarchies (Originally Submitted, Un-shortened Version)", Jul. 1, 2018, pp. 1-6, XP055679686, abstract, p. 3, paragraph 4.2, p. 4, paragraph 4.5.
International Search Report and Written Opinion—PCT/US2023/010611—ISA/EPO—May 12, 2023.

* cited by examiner

*Primary Examiner* — Nurun Flora
(74) *Attorney, Agent, or Firm* — QUALCOMM Incorporated

(57) ABSTRACT

Aspects presented herein relate to methods and devices for graphics processing including an apparatus, e.g., a GPU or CPU. The apparatus may configure a BVH structure including a plurality of nodes, the BVH structure being associated with geometry data for a plurality of primitives in a scene. The apparatus may also detect a set of child nodes for a current node of the plurality of nodes. Further, the apparatus may identify a first child node of the set of child nodes based on a node ID of the first child node. The apparatus may also calculate an offset between the node ID of the first child node and a node ID of each of the remaining child nodes in the set of child nodes. The apparatus may also store a representation of the node ID of each of the set of child nodes based on the calculated offset.

27 Claims, 14 Drawing Sheets

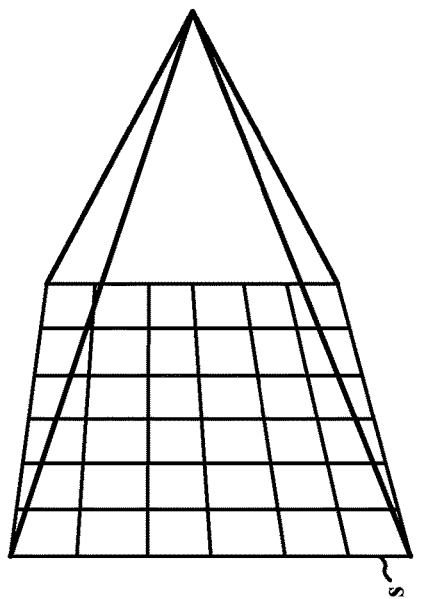
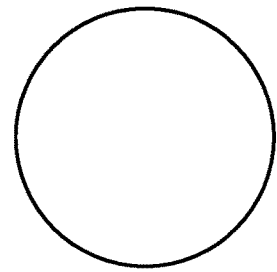
FIG. 4A
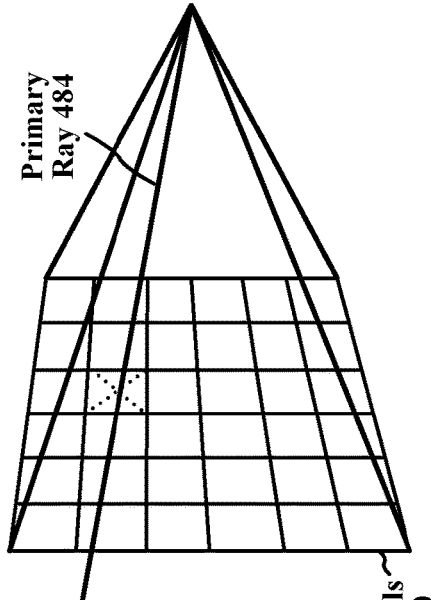
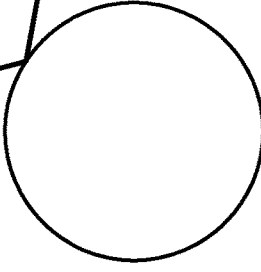
FIG. 4B

COMPRESSED TRAVERSAL STACK FOR GPU RAY TRACING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform graphics processing. The apparatus may configure a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). The apparatus may also detect a set of child nodes for a current node of the plurality of nodes, each of the set of child nodes being intersected by a current ray from a ray tracing process for the current node, each of the set of child nodes including a node ID. Additionally, the apparatus may sort the set of child nodes for the current node based on a traversal priority of the set of child nodes, where the first child node is identified based on the traversal priority of the set of child nodes. The apparatus may also read the node ID for the first child node of the set of child nodes, where the first child node is identified based on reading the node ID for the first child node. The apparatus may also identify a first child node of the set of child nodes based on a node ID of the first child node. Moreover, the apparatus may calculate an offset between the node ID of the first child node and a node ID of each of one or more remaining child nodes in the set of child nodes, the one or more remaining child nodes including each of the set of child nodes except the first child node. The apparatus may also generate a stack entry for the node ID of each of the set of child nodes, where the stack entry for the node ID of each of the set of child nodes is generated prior to being stored. Further, the apparatus may store a representation of the node ID of each of the set of child nodes based on the calculated offset between the node ID of the first child node and the node ID of each of the one or more remaining child nodes. The apparatus may also retrieve the representation of the node ID of each of the set of child nodes after the representation of the node ID of each of the set of child nodes is stored.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a diagram illustrating an example rasterization process.

FIG. 4B is a diagram illustrating an example ray tracing process.

DETAILED DESCRIPTION

Figure 1:
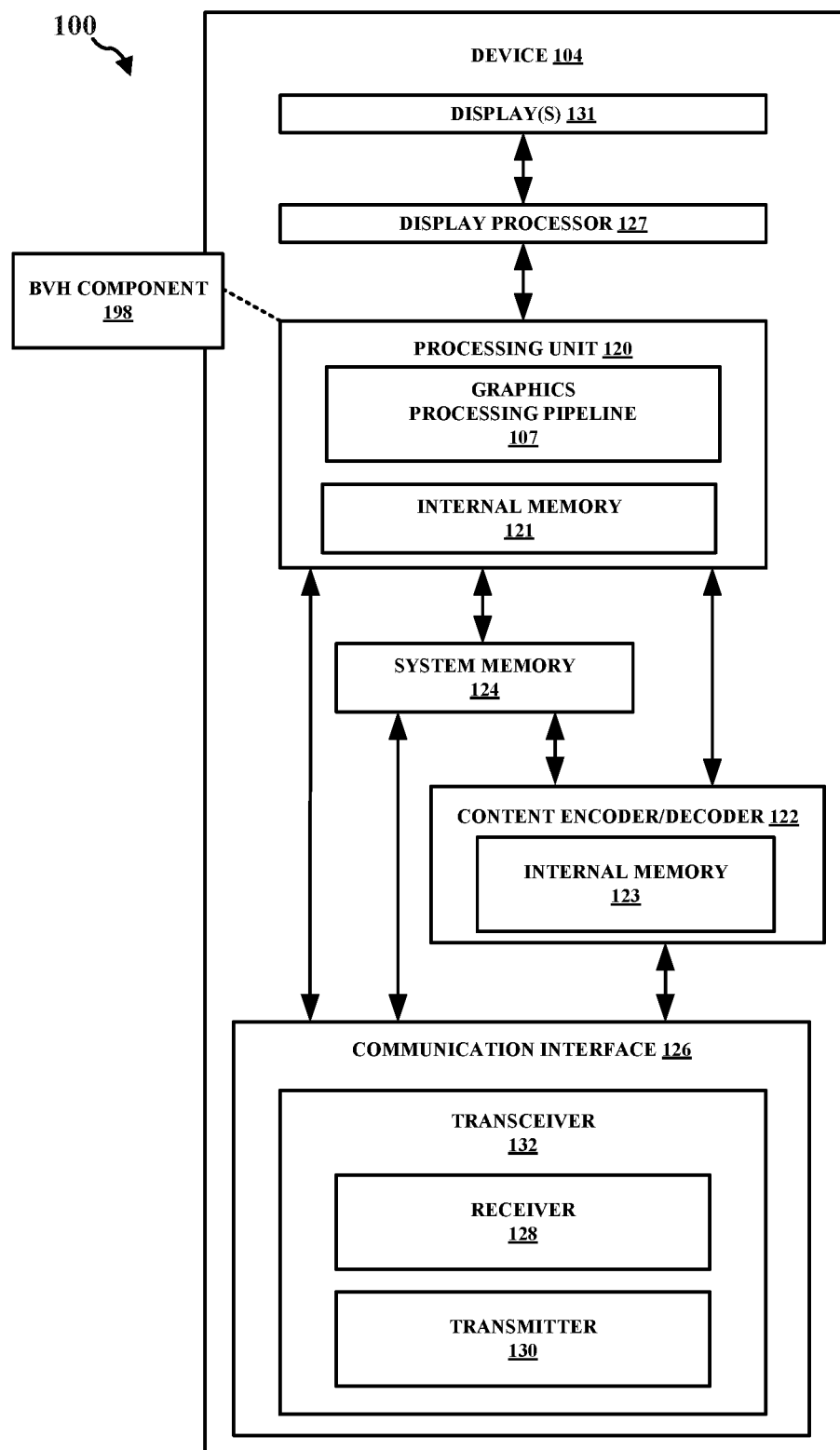
FIG. 1 is a block diagram that illustrates an example content generation system.

Some types of ray tracing algorithms may include tree traversal operations, where the core of the algorithm is the tree traversal operation. In some aspects, scenes may be converted into a bounding volume hierarchy (BVH), which is a hierarchical tree structure composed of ever-tighter bounding volumes. Some types of ray tracing units (RTUs) may utilize a compressed short stack approach during traversal. For instance, the RTU may traverse a given BVH node and return the result of a tree traversal hop to a GPU component, e.g., a compute shader. Additionally, the compute shader may maintain a traversal stack of finite size to keep track of which nodes may need to be traversed next. In some aspects of ray tracing, a BVH traversal algorithm may rely on a stack (i.e., a type of memory or cache), such as a traversal stack. The traversal stack may contain the unique identifiers of the nodes that may still need to be traversed. One implementation of a traversal stack may utilize a BVH with a certain branching factor (e.g., a branching factor of 8). A ray intersection of one interior node or inner node may lead to a number of intersections corresponding to the number of child nodes (i.e., children) that a ray may need to traverse. For example, the intersection of one interior node that results in 8 intersections may mean a certain ray needs to traverse 8 child nodes. When traversing 8 child nodes, the closest child node may be traversed immediately while the remaining 7 child nodes may need to be added to (i.e., pushed onto) the traversal stack for a later traversal. In some aspects of ray tracing, each node in a BVH structure may be tagged with a unique identification or identifier (ID), which may be referred to as a node ID (e.g., a 32-bit node ID). In the example of traversing 8 child nodes, one approach may be to add (i.e., push) all 7 child nodes onto a stack by adding (i.e., pushing) 7 individual 32-bit node IDs. This approach may be wasteful because the memory footprint for the stack may be larger than necessary. Additionally, this may have a negative impact on the performance of the GPU. For instance, a GPU may utilize many live rays at a time during ray tracing. Accordingly, these types of tree traversal operations utilize a lot of power at the GPU and take a lot of time to process. Aspects of the present disclosure may improve the speed of tree traversal operations that are processed by a GPU during ray tracing. Additionally, aspects of the present disclosure may improve the power efficiency of tree traversal operations in ray tracing. In order to do so, aspects of the present disclosure may compress certain aspects of the tree traversal operations. For instance, aspects of the present disclosure may compress certain nodes utilized in tree traversal operations in ray tracing. Aspects presented herein may also compress node IDs, or representations of node IDs, that are utilized in tree traversal operations. For example, a stack entry or a representation of a node ID may be compressed prior to being stored or added to a stack.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a BVH component 198 configured to configure a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). The BVH component 198 may also be configured to detect a set of child nodes for a current node of the plurality of nodes, each of the set of child nodes being intersected by a current ray from a ray tracing process for the current node, each of the set of child nodes including a node ID. The BVH component 198 may also be configured to sort the set of child nodes for the current node based on a traversal priority of the set of child nodes, where the first child node is identified based on the traversal priority of the set of child nodes. The BVH component 198 may also be configured to read the node ID for the first child node of the set of child nodes, where the first child node is identified based on reading the node ID for the first child node. The BVH component 198 may also be configured to identify a first child node of the set of child nodes based on a node ID of the first child node. The BVH component 198 may also be configured to calculate an offset between the node ID of the first child node and a node ID of each of one or more remaining child nodes in the set of child nodes, the one or more remaining child nodes including each of the set of child nodes except the first child node. The BVH component 198 may also be configured to generate a stack entry for the node ID of each of the set of child nodes, where the stack entry for the node ID of each of the set of child nodes is generated prior to being stored. The BVH component 198 may also be configured to store a representation of the node ID of each of the set of child nodes based on the calculated offset between the node ID of the first child node and the node ID of each of the one or more remaining child nodes. The BVH component 198 may also be configured to retrieve the representation of the node ID of each of the set of child nodes after the representation of the node ID of each of the set of child nodes is stored. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher, a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a vertex fetcher, may use these states to determine certain functions, e.g., how a vertex is assembled. As these modes or states may change, GPUs may need to change the corresponding context. Additionally, the workload that corresponds to the mode or state may follow the changing mode or state.

Figure 2:
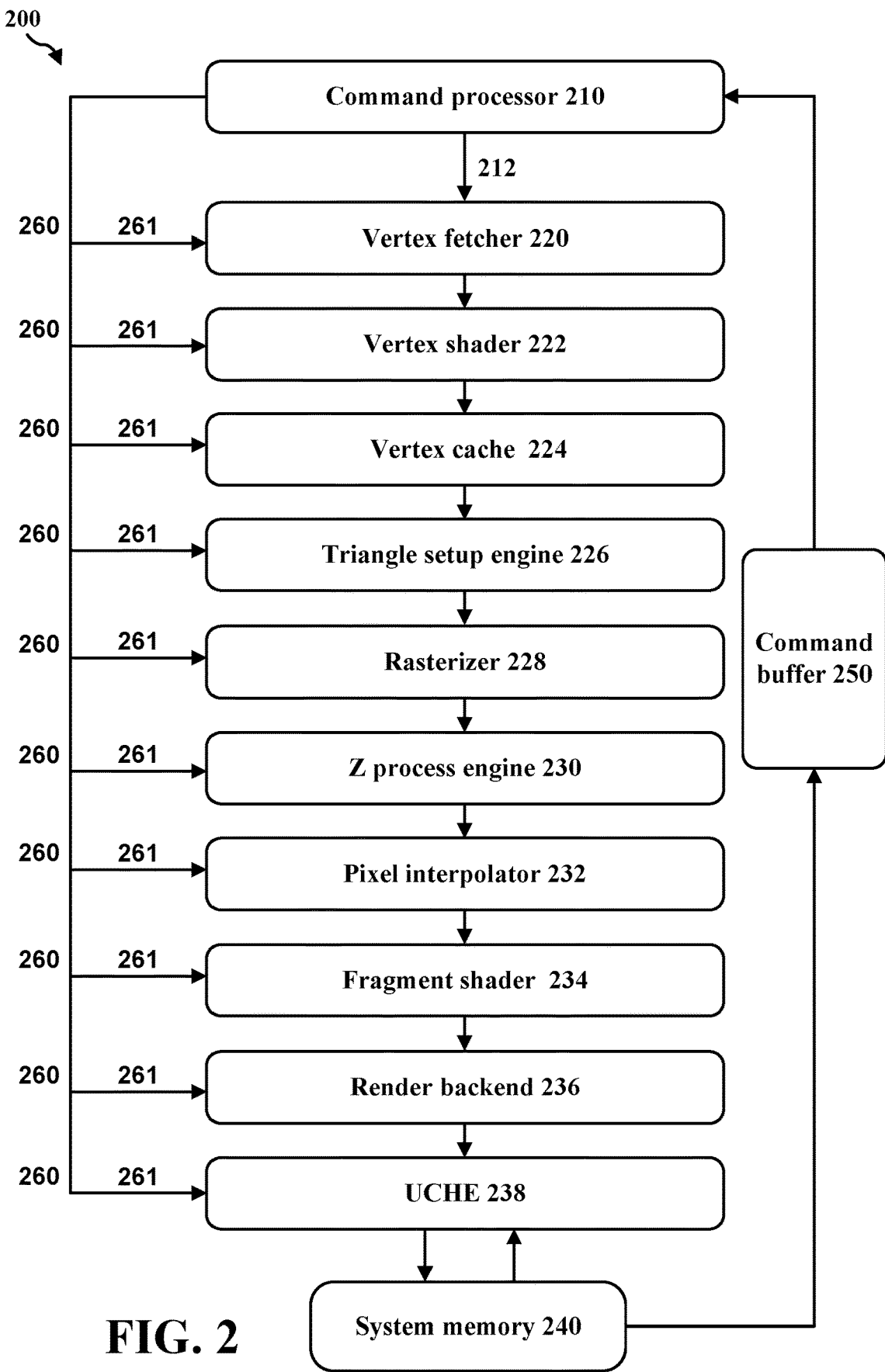
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, vertex fetcher 220, VS 222, vertex cache (VPC) 224, triangle setup engine 226, rasterizer 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU).

Figure 3:
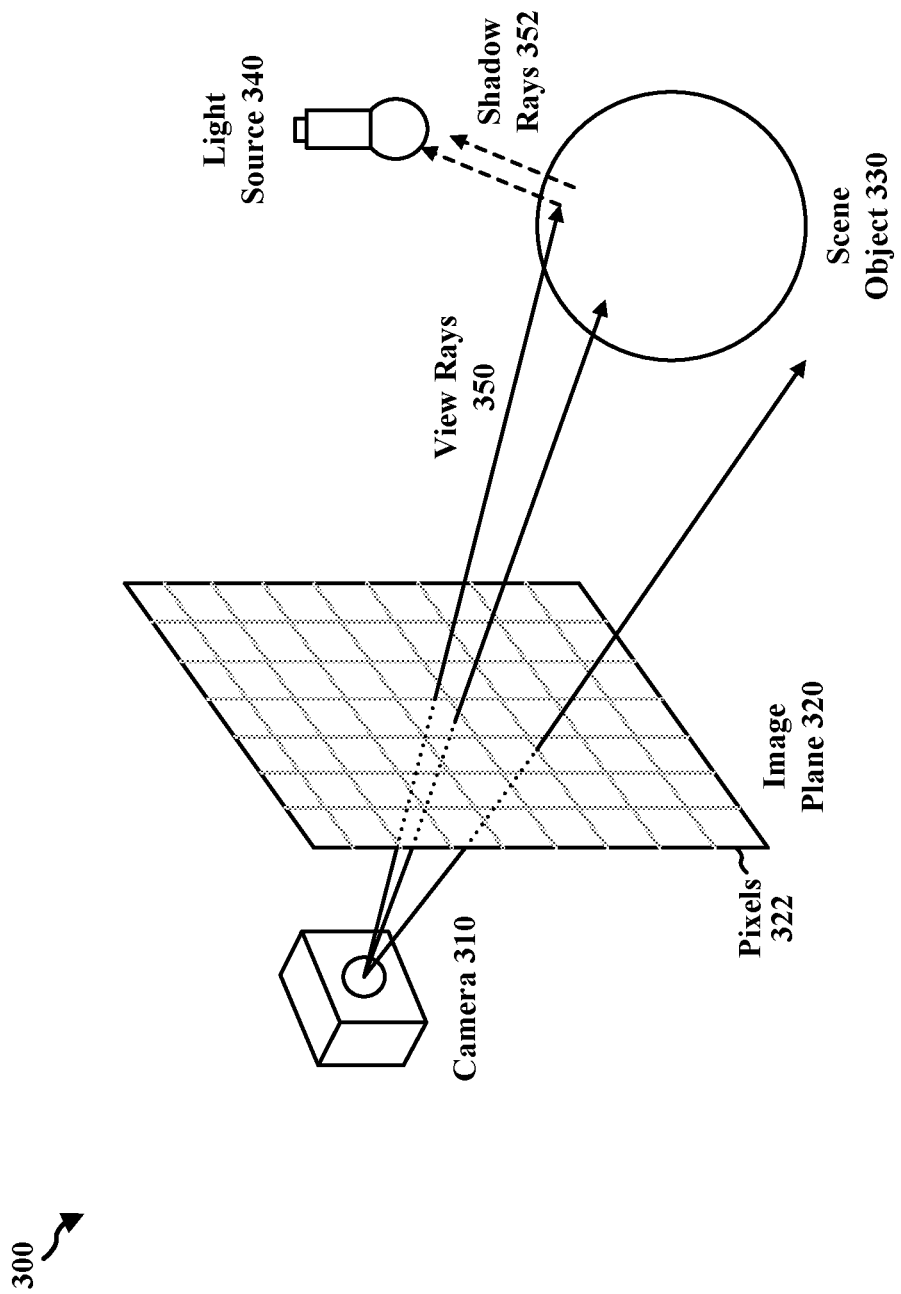
FIG. 3 is a diagram illustrating an example ray tracing process.

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340 to camera 310. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or intersect a certain primitive, then the pixel is shaded. In some instances of graphics processing, ray tracing algorithms may be performed alongside rasterization, such as via a hybrid ray tracing/rasterization model.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization determines, for each of pixels 420 in a scene including scene object 410, a pixel is shaded if at least a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or intersect a certain primitive in scene object 460 corresponding to one of the pixels 470 via primary ray 484, then the pixel is shaded.

As indicated herein, the process of ray tracing may be performed by determining whether a ray will hit/intersect any primitive(s) in a scene. For example, ray tracing algorithms may perform a simple query operation: Is a given ray going to hit/intersect any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum time to intersect primitives in a scene ($t_{min}$), a maximum time to intersect primitives in a scene ($t_{max}$), and a calculated distance to intersect primitives in the scene.

Figure 5:
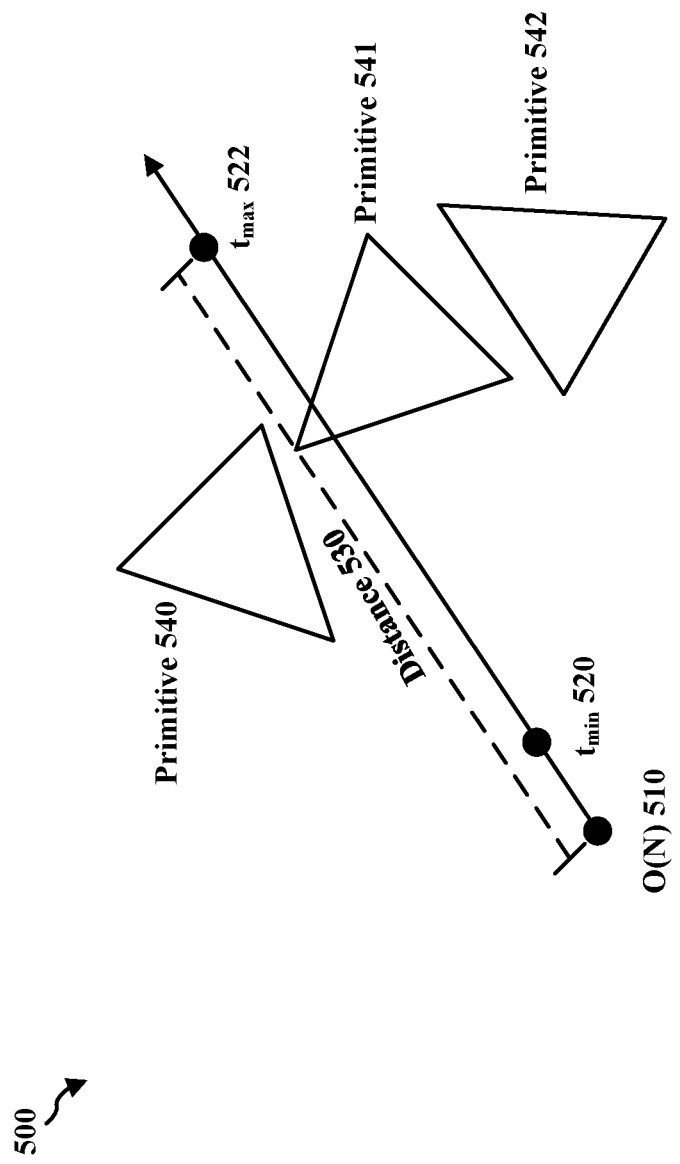
FIG. 5 is a diagram illustrating an example ray tracing process.

FIG. 5 illustrates diagram 500 including one example of a ray tracing process involving triangles as primitives. As shown in FIG. 5, diagram 500 includes origin point for a ray (O(N) 510), a minimum time to intersect primitives in a scene ($t_{min}$ 520), a maximum time to intersect primitives in a scene ($t_{max}$ 522), a calculated distance to intersect primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will intersect a primitive, ray tracing techniques may utilize an origin point for a ray (O(N) 510), a minimum time to intersect primitives ($t_{min}$ 520), a maximum time to intersect primitives ($t_{max}$ 522), a calculated distance to intersect primitives (distance 530), and a number of primitives (primitive 540, primitive 541, and primitive 542).

Ray tracing may utilize various data structures for accelerating a computational process, such as a bounding volume hierarchy (BVH). In a bounding volume hierarchy, primitives are held in leaf nodes. Further, internal or inner nodes may hold bounding boxes/volumes, such as axis-aligned bounding boxes (AABBs), defined by a pair of bounding planes in each of three dimensions, that enclose certain leaf node geometry. Each of the AABBs may include one or more (geometric) primitives, where the number of primitives within each AABB may vary. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log(N).

Figure 6B:
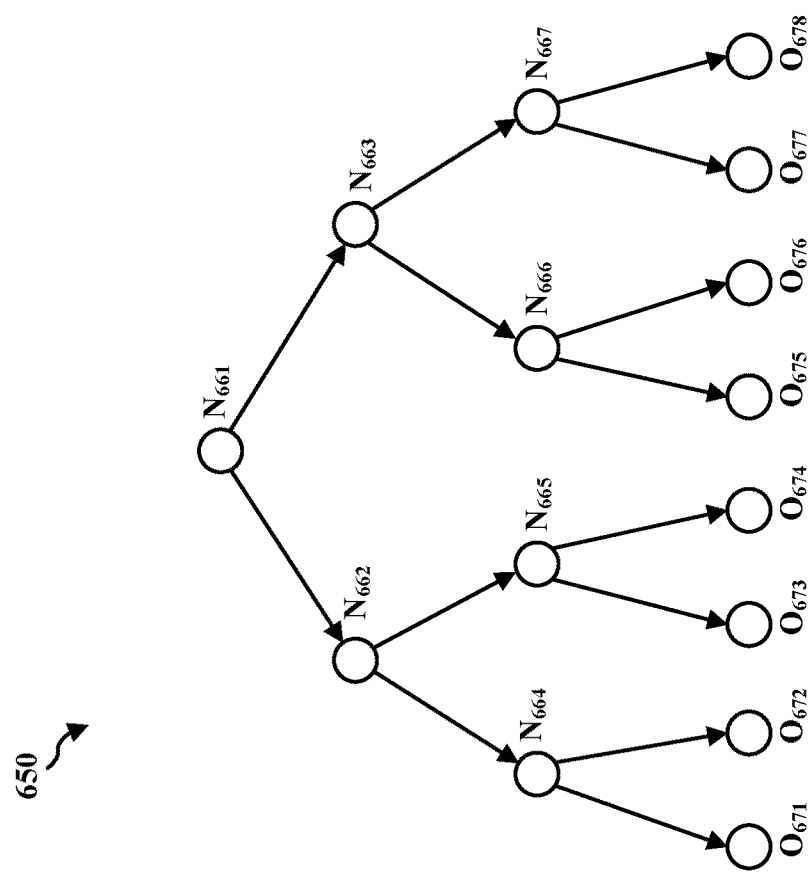
FIG. 6B is a diagram illustrating an example data structure.
Figure 6A:
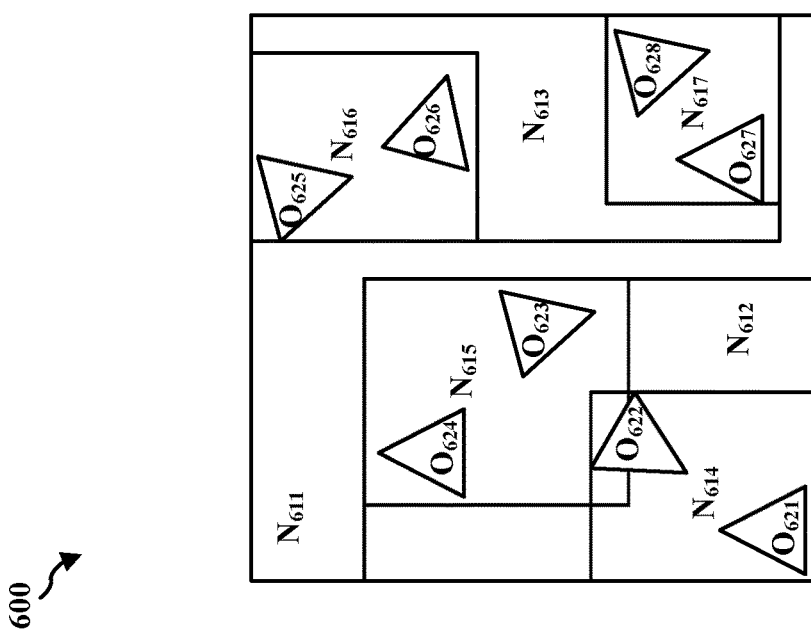
FIG. 6A is a diagram illustrating an example data structure.

FIGS. 6A and 6B illustrate diagram 600 and diagram 650, respectively, including example data structure techniques utilized in ray tracing. As shown in FIG. 6A, diagram 600 includes a number of nodes (nodes $N_{611}$-$N_{617}$) and a number of primitives (primitives $O_{621}$-$O_{628}$). FIG. 6A depicts a ray-box intersection for nodes $N_{611}$-$N_{617}$ and primitives $O_{621}$-$O_{628}$. As shown in FIG. 6B, diagram 650 includes a number of nodes (nodes $N_{661}$-$N_{667}$) and a number of primitives (primitives $O_{671}$-$O_{678}$). FIG. 6B depicts a ray-triangle test for nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process. For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \log n}$ solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (e.g., a BVH) to a wide BVH (e.g., an 8-branch wide BVH). In some instances of BVH widening, an internal node may include up to eight AABBs and a leaf node may include up to four primitives or triangles.

Figures 7A, 7B:
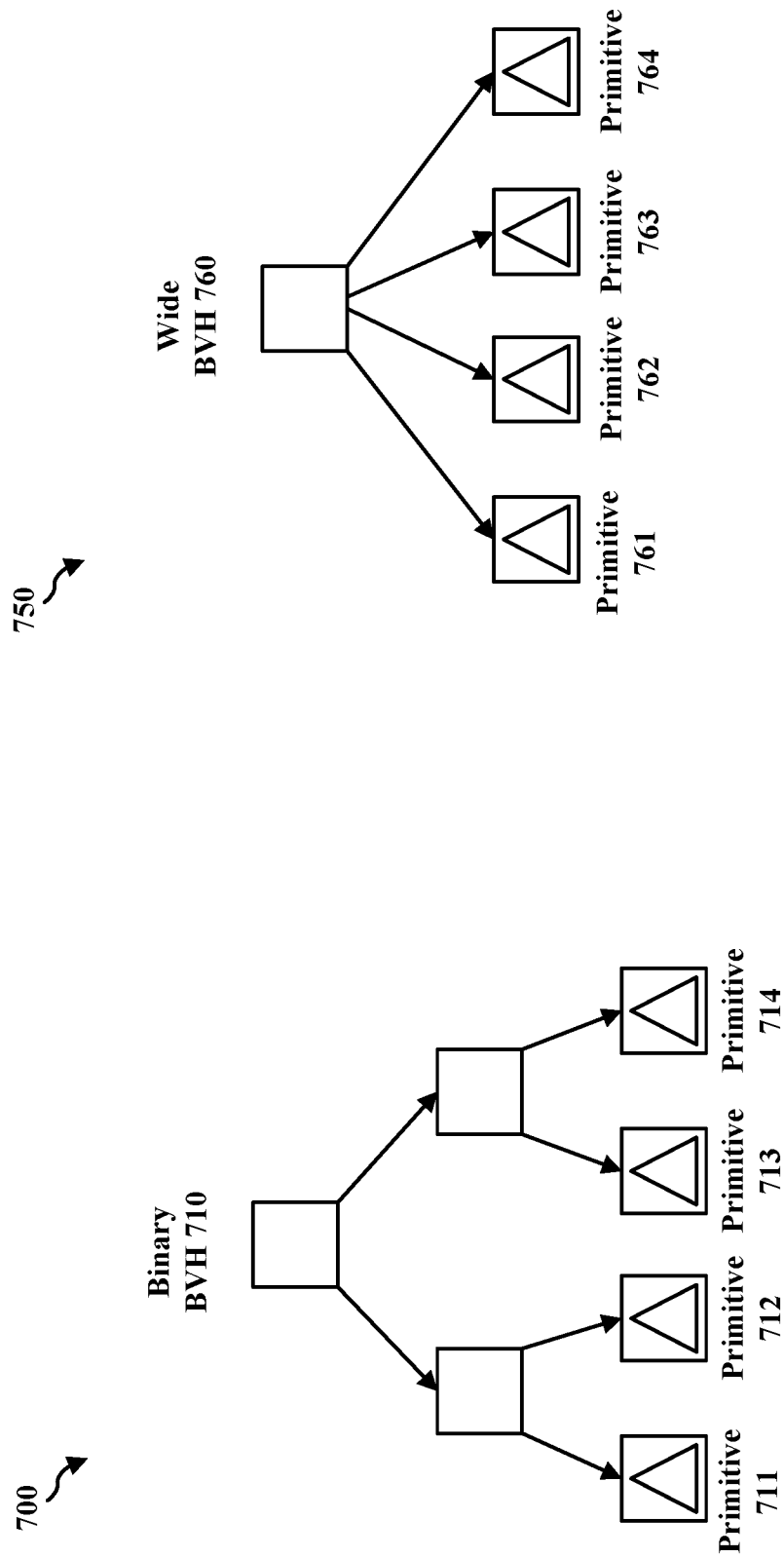
FIG. 7A is a diagram illustrating an example bounding volume hierarchy.
FIG. 7B is a diagram illustrating an example bounding volume hierarchy.

FIGS. 7A and 7B illustrate diagram 700 and diagram 750 including a binary bounding volume hierarchy and a wide bounding volume hierarchy, respectively. As shown in FIG. 7A, diagram 700 includes a binary bounding volume hierarchy 710 including primitive 711, primitive 712, primitive 713, and primitive 714. FIG. 7A depicts that binary bounding volume hierarchy 710 includes three levels, where primitives 711-714 are in the third level of the hierarchy. As shown in FIG. 7B, diagram 750 includes a wide bounding volume hierarchy 760 including primitive 761, primitive 762, primitive 763, and primitive 764. FIG. 7B depicts that wide bounding volume hierarchy 760 includes two levels, where primitives 761-764 are in the second level of the hierarchy. As shown in FIGS. 7A and 7B, binary bounding volume hierarchy 710 may undergo a process of bounding volume hierarchy widening that results in wide bounding volume hierarchy 760.

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software, e.g., GPU/CPU hardware or software. For instance, in certain stages (e.g., a BVH construction stage and a BVH node compression stage), a driver may construct the BVH on a CPU or GPU. In a BVH traversal stage, the BVH traversal may occur in the shader at the GPU. Also, certain stages (e.g., a BVH node decompression stage, a ray-bounding box intersection stage, and a ray-triangle intersection stage) may be implemented within GPU hardware.

As indicated previously, ray tracing procedures may include computer graphics algorithms that produce photorealistic renderings with a higher degree of photorealism compared to other types of algorithms (e.g., rasterization algorithms). Modern GPUs may run ray tracing applications through certain units (e.g., a compute shader) but may often fail to perform these applications in an efficient manner, such as via GPU ray tracing software. Some types of ray tracing algorithms may utilize certain types of hardware accelerators, such as a ray tracing unit (RTU). The RTU may enable hardware-accelerated ray tracing on the GPU to accelerate the ray tracing operation and allow the GPU to consume less power compared to running the ray tracing operation on compute shaders.

Some types of ray tracing algorithms may include tree traversal operations, where the core of the algorithm is the tree traversal operation. In some aspects, scenes may be converted into a bounding volume hierarchy (BVH), which is a hierarchical tree structure composed of ever-tighter bounding volumes. Some types of RTUs may utilize a compressed short stack approach during traversal. For instance, the RTU may traverse a given BVH node and return the result of a tree traversal hop to a GPU component, e.g., a compute shader. Additionally, the compute shader may maintain a traversal stack of finite size to keep track of which nodes may need to b e traversed next.

In some aspects of ray tracing, a BVH traversal algorithm may rely on a stack (i.e., a type of memory or cache), such as a traversal stack. The traversal stack may contain the unique identifiers of the nodes that may still need to be traversed. One implementation of a traversal stack may utilize a BVH with a certain branching factor (e.g., a branching factor of 8). A ray intersection of one interior node or inner node may lead to a number of intersections corresponding to the number of child nodes (i.e., children) that a ray may need to traverse. For example, the intersection of one interior node that results in 8 intersections may mean a certain ray needs to traverse 8 child nodes. When traversing 8 child nodes, the closest child node may be traversed immediately while the remaining 7 child nodes may need to be added to (i.e., pushed onto) the traversal stack for a later traversal.

In some aspects of ray tracing, each node in a BVH structure may be tagged with a unique identification or identifier (ID), which may be referred to as a node ID (e.g., a 32-bit node ID). In the example of traversing 8 child nodes, one approach may be to add (i.e., push) all 7 child nodes onto a stack by adding (i.e., pushing) 7 individual 32-bit node IDs. This approach may be wasteful because the memory footprint for the stack may be larger than necessary. Additionally, this may have a negative impact on the performance of the GPU. For instance, a GPU may utilize many live rays at a time during ray tracing. For example, a GPU utilizing 12 shader processors (SPs), which each run 10 waves with 64 fibers per wave, may utilize 7680 live rays at a time. If each ray's stack has 32 stack entries, that may be equal to 245,760 words. Accordingly, these types of tree traversal operations utilize a lot of power at the GPU and take a lot of time to process.

Based on the above, it may be beneficial to improve the speed of tree traversal operations that are processed by a GPU during ray tracing. Further, it may be beneficial to improve the power efficiency of tree traversal operations in ray tracing. To do so, it may be beneficial to compress certain aspects of the tree traversal operations. For instance, it may be beneficial to compress the nodes or node IDs utilized in tree traversal operations in ray tracing.

Aspects of the present disclosure may improve the speed of tree traversal operations that are processed by a GPU during ray tracing. Additionally, aspects of the present disclosure may improve the power efficiency of tree traversal operations in ray tracing. In order to do so, aspects of the present disclosure may compress certain aspects of the tree traversal operations. For instance, aspects of the present disclosure may compress certain nodes utilized in tree traversal operations in ray tracing. Aspects presented herein may also compress node IDs, or representations of node IDs, that are utilized in tree traversal operations. For example, a stack entry or a representation of a node ID may be compressed prior to being stored or added to a stack.

As indicated herein, aspects presented herein may compress certain types of stack entries. For instance, aspects presented herein may improve the speed and power efficiency of tree traversal operations at the core of ray tracing algorithms by compressing traversal stack entries. Aspects presented herein may utilize a number of different traversal stack compression schemes. In some instances, aspects presented herein may utilize traversal stack compression schemes that maintain a number of child nodes and a corresponding ray intersection order (i.e., hit order) within a stack entry. For example, aspects presented herein may maintain 8 child nodes and their corresponding ray intersection order (i.e., hit order) within one 64-bit compressed stack entry. This process may be referred to as a lossless compression. In some instances, aspects presented herein may utilize traversal stack compression schemes that maintain a number of nodes that are closest to a certain parent node or a certain child node. This may also include support for revisiting the parent node or child node. For example, aspects presented herein may maintain a variable number of closest nodes with support for revisiting the parent node or child node. This process may be referred to as a lossy compression.

Aspects presented herein may compress all node IDs from each level in a BVH structure. For example, all node IDs from each level in a BVH structure may be compressed into a compressed stack entry (e.g., a stack entry of 64 bits). As indicated above, aspects of the present disclosure may utilize a lossless compression scheme in order to compress the node IDs from each level in a BVH structure into a compressed stack entry. This compressed stack entry may be a dual entry within the stack, where each entry is 32 bits, such that both entries combine to fill a single 64-bit stack entry. One example of this 64-bit duel stack entry is shown in the traversal stack compression scheme in FIG. 8.

Figure 8:
FIG. 8 is a diagram illustrating an example stack entry for a ray tracing procedure.

FIG. 8 illustrates diagram 800 including one example of a stack entry for a ray tracing procedure. More specifically, diagram 800 in FIG. 8 shows a dual-stack entry including stack section 802 and stack section 852 for a traversal stack compression scheme. As shown in FIG. 8, stack section 802 includes 8 child nodes (e.g., Child810-Child817) within a 32-bit structure. Stack section 802 shows that the child nodes are stored in a corresponding ray intersection order (i.e., hit order), e.g., Child810, Child811, Child812, Child813, Child814, Child815, Child816, Child817. Accordingly, Child810 includes the highest priority in a traversal priority order, and Child817 includes the lowest priority in the traversal priority order. Also, each of the child nodes corresponds to a 3-bit entry, such that there is a 3-bit offset between adjacent child nodes. Stack section 802 also includes an unused entry 820 of 3 bits and a bitmask 830 (e.g., a NextChildShift bitmask) of 5 bits. Stack section 802 may be referred to as a child hits section of the stack, i.e., referring to the ray intersection of the child nodes. As shown in FIG. 8, stack section 852 includes an unused entry 860 of 3 bits and a Child810 node ID 870 (i.e., a node ID for Child810) of 29 bits. Stack section 852 may be referred to as the Child810 node ID section of the stack. Therefore, both stack section 802 and stack section 852 correspond to 32-bit stack sections.

As shown in FIG. 8, a certain stack entry may be used to represent the offset of a child node for a certain level in a BVH array. For example, Child810 Node ID 870 may represent the offset of the first child for a level in the BVH array. Each of the remaining child nodes in the array level (e.g., 7 subsequent children of the level) may be stored contiguously in the BVH array. The two 32-bit entries may be stored in one 64-bit entry of the stack. Accordingly, stack section 802 and stack section 852 may combine to form a dual-stack entry in a stack.

As further shown in FIG. 8, when storing child nodes onto the stack as part of a ray tracing process, the child nodes may be stored in a sorted order in the stack entry (i.e., a traversal priority order). The order may be encoded by storing the highest priority child at a first child node entry (e.g., Child810) and the lowest priority child at a last child node entry (e.g., Child817). Each entry in the stack (e.g., stack section 802 or the child hits section of the stack) may store an offset (e.g., a 3-bit offset). Adding this offset to a stack entry for a certain child node (e.g., Child810 Node ID 870) may yield the node ID of the child node (e.g., the node ID for Child810).

As depicted in FIG. 8, aspects presented herein may encode the next node with a bitmask (e.g., the 5-bit NextChildShift bitmask 830). This bitmask may help to reduce the amount of shader code that is necessary to format the stack entries. For instance, the bitmask (e.g., NextChildShift bitmask 830) may keep track of the child nodes that have been searched or retrieved from the stack (i.e., popped off the stack) as part of the ray tracing process. If there are stack entries for a certain number of child nodes stored in the stack, the bitmask may be equivalent to the number of child nodes. For example, if there are stack entries for 8 child nodes stored in the stack, the bitmask may be equivalent to 8. As the child nodes are retrieved from the stack, the bitmask may be reduced in value. If the first child node (e.g., Child810) is retrieved from the stack, the node ID of the closest child may be determined based on a certain formula. For example, the node ID of the closest child may be determined by computing: node ID of next child node=Child810 Node ID+((child hits>>NextChildShift bitmask) & 0×7. As indicated in the above formula, the node ID of a next child node may be based on a node ID of a first child node, a number of child node intersections by a certain ray (i.e., child hits), and a NextChildShift bitmask. By using the stack compression process disclosed herein, the amount of stack storage to store a certain number of rays and corresponding child node intersections may be significantly reduced. For example, the stack storage for 7680 rays may be reduced from 245,760 words to 61,440 words.

Figure 9:
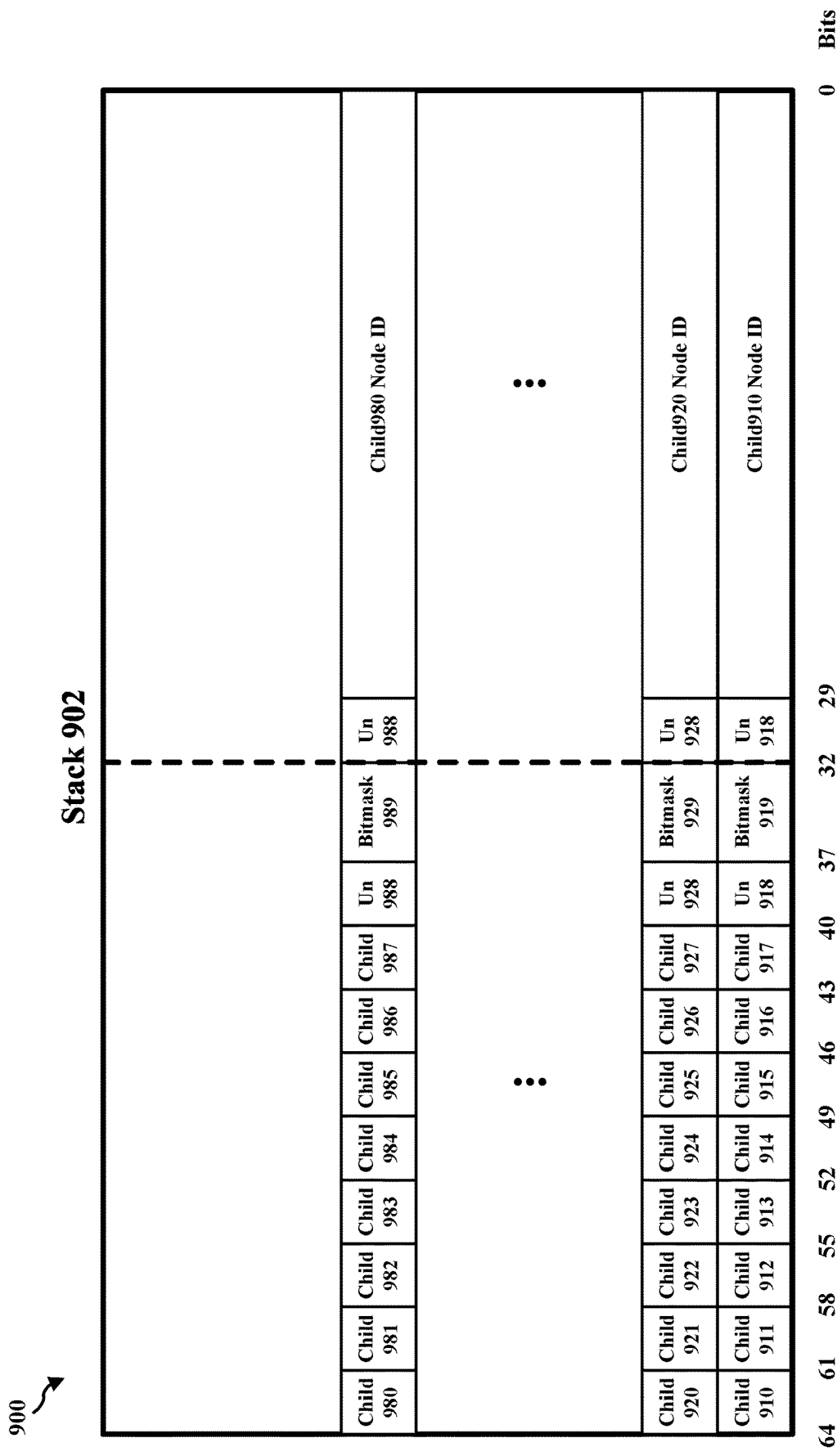
FIG. 9 is a diagram illustrating an example stack for a ray tracing procedure.

FIG. 9 illustrates diagram 900 including one example of a stack for a ray tracing procedure. More specifically, diagram 900 in FIG. 9 shows a dual-entry stack 902 including a number of stack levels for a traversal stack compression scheme. As shown in FIG. 9, stack 902 includes a number of levels including eight child nodes, two unused entries, a bitmask, and a Child Node ID within a 64-bit structure per level. For example, each of the child nodes is 3 bits, each of the unused entries is 3 bits, each of the bitmasks is 5 bits, and each of the Child Node IDs is 29 bits. As shown in FIG. 9, different levels of stack 902 include different entries. For instance, the first level of stack 902 includes Child910-Child917, unused entries 918, bitmask 919, and Child910 Node ID. The second level of stack 902 includes Child920-Child927, unused entries 928, bitmask 929, and Child920 Node ID. Also, the eighth level of stack 902 includes Child980-Child987, unused entries 988, bitmask 989, and Child980 Node ID. FIG. 9 illustrates a dual-entry stack that is sufficient to store the stack sections depicted in FIG. 8.

Aspects presented herein may also utilize compression schemes that further reduce the memory overhead of a stack entry, which may be different from the compression schemes described above. For instance, following the same basic compression schemes mentioned above, aspects presented herein may further reduce the memory overhead by employing a different type of stack entry layout. For example, aspects presented herein may reduce the memory overhead of a stack from 64 bits to 32 bits by employing a certain stack entry layout, such as the stack entry layout shown in FIG. 10.

Figure 10:
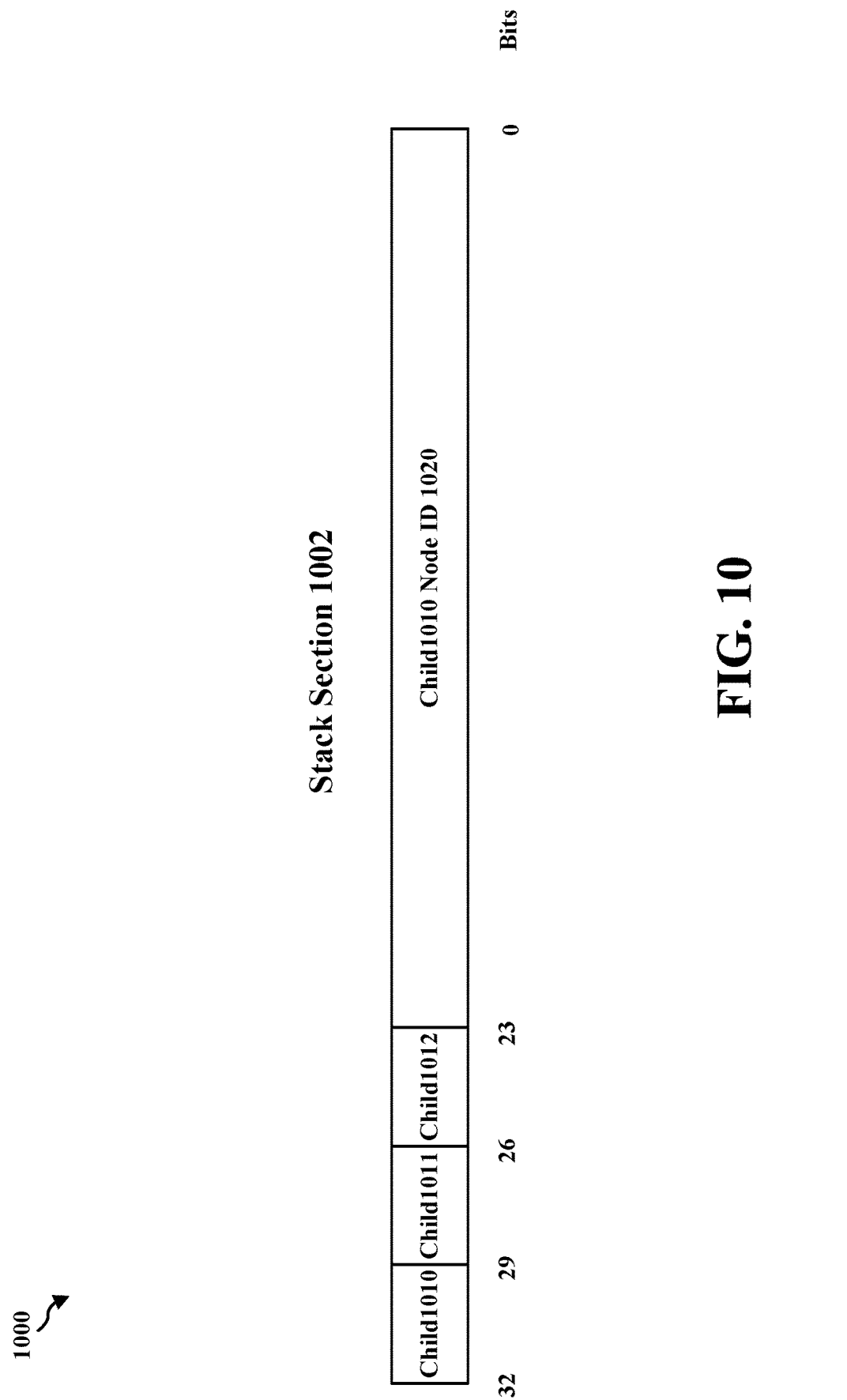
FIG. 10 is a diagram illustrating an example stack entry for a ray tracing procedure.

FIG. 10 illustrates diagram 1000 including one example of a stack entry for a ray tracing procedure. More specifically, diagram 1000 in FIG. 10 shows a single stack entry including stack section 1002 for a traversal stack compression scheme. As shown in FIG. 10, stack section 1002 includes three child nodes (e.g., Child1010, Child1011, and Child1012) within a 32-bit structure. In stack section 1002, the child nodes are stored in a corresponding ray intersection order (i.e., hit order), e.g., Child1010, Child1011, and Child1012. Therefore, Child1010 includes the highest priority in a traversal priority order, and Child1012 includes the lowest priority in the traversal priority order. Further, each of the child nodes corresponds to a 3-bit entry, such that there is a 3-bit offset between adjacent child nodes. Stack section 1002 also includes Child1010 node ID 1020 (i.e., a node ID for Child1010) of 23 bits. Thus, stack section 1002 corresponds to a 32-bit section.

As depicted in FIG. 10, aspects presented herein may reduce the number of bits (e.g., 23 bits) used to store the node ID of a first child node (e.g., Child1010 node ID 1020). As further shown in FIG. 10, aspects presented herein may reduce the number of closest child nodes that are stored (e.g., the three closest child nodes). Unlike the 64-bit compression using two 32-bit stack sections shown in FIG. 8, the 32-bit compression in FIG. 10 may represent the node ID of a first child node (e.g., Child1010 node ID 1020) using fewer bits, which may place a constraint on the size of the BVH structure. Accordingly, the BVH structure may allow for the total number of nodes to be represented using 23 bits. Further, the 32-bit compression shown in FIG. 10 may store a certain number of child nodes (e.g., 3 child nodes) that is less than the number of child nodes stored in a 64-bit compression (e.g., 8 child nodes). Aspects presented herein may also utilize a mechanism to retrieve the child nodes that are not recorded in the stack entry if there are more than a number of child nodes that are intersected by a ray (e.g., more than 3 child nodes). Additionally, aspects presented herein may add (i.e., push) the parent stack entry back onto the stack if more than a certain amount of child nodes (e.g., 3 child nodes) are detected. In this case, aspects presented herein may first traverse all of the child nodes (e.g., 3 child nodes) before revisiting the parent stack entry and adding (i.e., pushing) the remaining child nodes onto the traversal stack. For example, the lossy compression shown in FIG. 10 may reduce the number of memory words (e.g., reduce the number of memory words from 61,440 words to 30,720 words).

Aspects presented herein may also utilize compression schemes that are not concerned with a traversal priority or a ray intersection priority of the nodes. In some instances, the traversal priority order of the child node intersections may not be relevant to a compression scheme, such as when utilizing shadow rays. In these instances, any intersection (i.e., hit) may satisfy the ray query, such that the closest intersection may not be prioritized. In this case, aspects presented herein may represent the intersected (i.e., hit) child nodes using a simple bitmask, as in FIG. 11, rather than an array of child node offsets.

Figure 11:
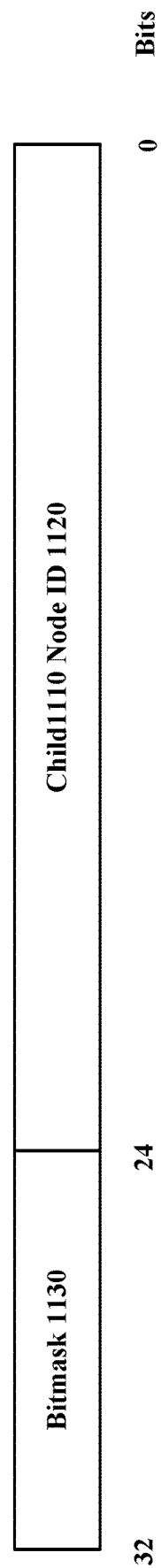
FIG. 11 is a diagram illustrating an example stack entry for a ray tracing procedure.

FIG. 11 illustrates diagram 1100 including one example of a stack entry for a ray tracing procedure. More specifically, diagram 1100 in FIG. 11 shows a single stack entry including stack section 1102 for a traversal stack compression scheme. As shown in FIG. 11, stack section 1102 includes a bitmask 1130 within a 32-bit entry structure. Further, the bitmask 1130 is equal to 8 bits. Stack section 1102 also includes Child1110 node ID 1120 (i.e., a node ID for Child1110) of 24 bits. Therefore, stack section 1102 corresponds to a 32-bit stack section.

As shown in FIG. 11, each bit in the bitmask 1130 corresponds to a child node that may be intersected by a ray. For example, if bit 3 of the bitmask 1130 is true, then the node ID for Child1110 (e.g., Child1110 node ID 1120) plus an amount of 3 may be traversed. The representation depicted in FIG. 11 has the advantage of storing all of the child node intersections (i.e., hits) for a certain stack level (e.g., 8 child node intersections). The representation in FIG. 11 may be used with closest-hit rays for a certain node (i.e., where order matters), but the stack may not represent which child node should be traversed first due to its proximity to other nodes.

In some aspects of the present disclosure, the representation of which child nodes are intersected (i.e., hit) may be needed not just for storage on a traversal stack, but also for returning child node intersections (i.e., hits) from a ray tracing unit. For instance, aspects of the present disclosure may utilize a decreased amount of clock cycles to write the node IDs, such as write the node IDs from a ray tracing unit (RTU) to certain register files (e.g., general purpose registers (GPRs)). In other implementations that do not utilize compression and return each node ID separately, this may cause an increased amount of clock cycles to write the node IDs. By using a compressed representation of the hit children of a node, aspects presented herein may deploy this compressed representation to reduce each of the above costs (e.g., reduce the cost from eight clock cycles to two clock cycles).

Aspects of the present disclosure may include a number of benefits or advantages. For instance, aspects of the present disclosure may reduce the memory footprint of a stack entry at no performance cost to a GPU. For example, the lossless compression schemes utilized herein may reduce the memory footprint of a stack entry at no performance cost to the ray tracing procedure. Additionally, aspects of the present disclosure may utilize lossy compression schemes that improve the performance impact of the ray tracing procedure. For example, lossy compression schemes may not revisit parent stack entries if the number of child node intersections (i.e., hits) exceeds a capacity of the stack entry. Accordingly, there may be a limited number of redundant node fetches that impact the performance of the ray tracing procedure. Aspects presented herein may maintain the capacity of a stack entry and allow for a reduced performance degradation by using this lossless compression scheme. For example, the number of node fetches may be limited to a certain amount (e.g., limited to a 7% increase in fetches) and, in some cases, the number of node fetches may be improved.

Figure 12:
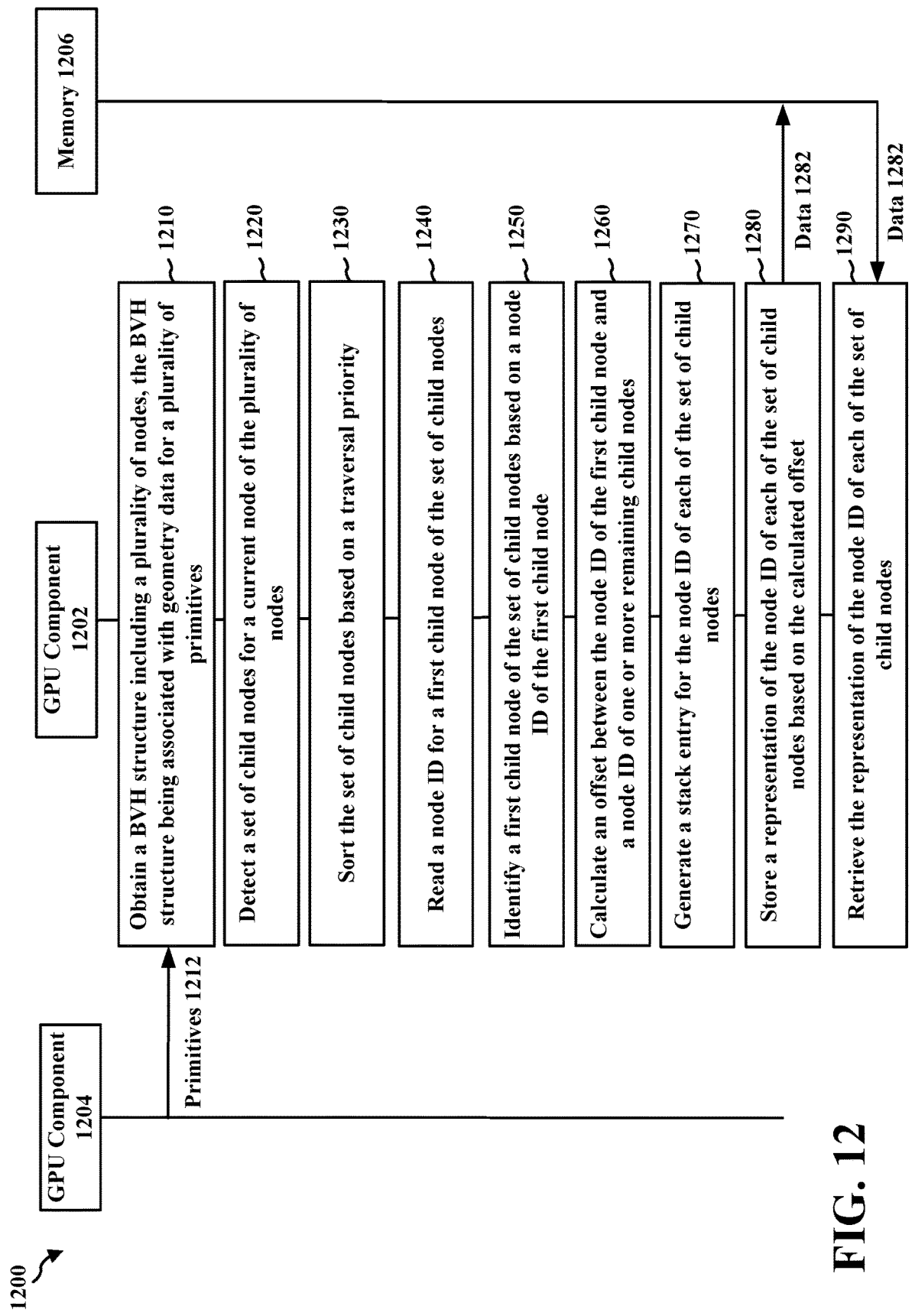
FIG. 12 is a communication flow diagram illustrating example communications between GPU components.

FIG. 12 is a communication flow diagram 1200 of graphics processing in accordance with one or more techniques of this disclosure. As shown in FIG. 12, diagram 1200 includes example communications between components of a GPU (or other graphics processor), e.g., GPU component 1202, GPU component 1204, and memory 1206 (e.g., a stack or cache), in accordance with one or more techniques of this disclosure.

At 1210, GPU component 1202 may obtain a bounding volume hierarchy (BVH) structure including a plurality of nodes, the BVH structure being associated with geometry data for a plurality of primitives in a scene (e.g., primitives 1212 from GPU component 1204), each of the plurality of nodes being associated with one or more primitives of the plurality of primitives, each of the plurality of nodes being associated with a node identifier (ID). The BVH structure may include a plurality of levels such that each of the plurality of levels includes at least one node of the plurality of nodes.

At 1220, GPU component 1202 may detect a set of child nodes for a current node of the plurality of nodes, each of the set of child nodes being intersected by a current ray from a ray tracing process for the current node, each of the set of child nodes including a node ID. The node ID for each of the set of child nodes may be based on the node ID for the current node. The set of child nodes may be equal to 8 child nodes, and the node ID for each of the set of child nodes may be equal to 32 bits. The ray tracing process for the current node may include a plurality of rays, where the current ray is included in the plurality of rays.

At 1230, GPU component 1202 may sort the set of child nodes for the current node based on a traversal priority of the set of child nodes, where the first child node is identified based on the traversal priority of the set of child nodes.

At 1240, GPU component 1202 may read the node ID for the first child node of the set of child nodes, where the first child node is identified based on reading the node ID for the first child node.

At 1250, GPU component 1202 may identify a first child node of the set of child nodes based on a node ID of the first child node. In some aspects, a node ID of a closest child node to the first child node may be calculated based on the node ID of the first child node and a bitmask for an amount of shift for each of the one or more remaining child nodes.

At 1260, GPU component 1202 may calculate an offset between the node ID of the first child node and a node ID of each of one or more remaining child nodes in the set of child nodes, the one or more remaining child nodes including each of the set of child nodes except the first child node. In some aspects, calculating the offset between the node ID of the first child node and the node ID of each of the one or more remaining child nodes may further include compressing the node ID of the first child node and the node ID of each of the one or more remaining child nodes. Also, calculating the offset between the node ID of the first child node and the node ID of each of the one or more remaining child nodes may further include shifting the representation of the node ID of each of the one or more remaining child nodes. Shifting the representation of the node ID of each of the one or more remaining child nodes may include shifting at least one bit of a stack entry for the node ID of each of the one or more remaining child nodes. The offset between the node ID of the first child node and the node ID of each of the one or more remaining child nodes may be a compressed offset.

At 1270, GPU component 1202 may generate a stack entry for the node ID of each of the set of child nodes, where the stack entry for the node ID of each of the set of child nodes is generated prior to being stored. For instance, the representation of the node ID may be a stack entry for the node ID of each of the set of child nodes. Also, the stack entry for the node ID of each of the set of child nodes may be stored in at least one of: a stack, a memory, a cache, or a register.

At 1280, GPU component 1202 may store a representation of the node ID of each of the set of child nodes (e.g., store data 1282 in memory 1206) based on the calculated offset between the node ID of the first child node and the node ID of each of the one or more remaining child nodes.

At 1290, GPU component 1202 may retrieve the representation of the node ID of each of the set of child nodes (e.g., retrieve data 1282 from memory 1206) after the representation of the node ID of each of the set of child nodes is stored. In some aspects, retrieving the representation of the node ID of each of the set of child nodes may further include decompressing the node ID of each of the set of child nodes. Also, retrieving the representation of the node ID of each of the set of child nodes may further include shifting the representation of the node ID of each of the one or more remaining child nodes, such that the representation of the node ID of each of the one or more remaining child nodes may be shifted back to the representation of the node ID prior to being stored.

Figure 13:
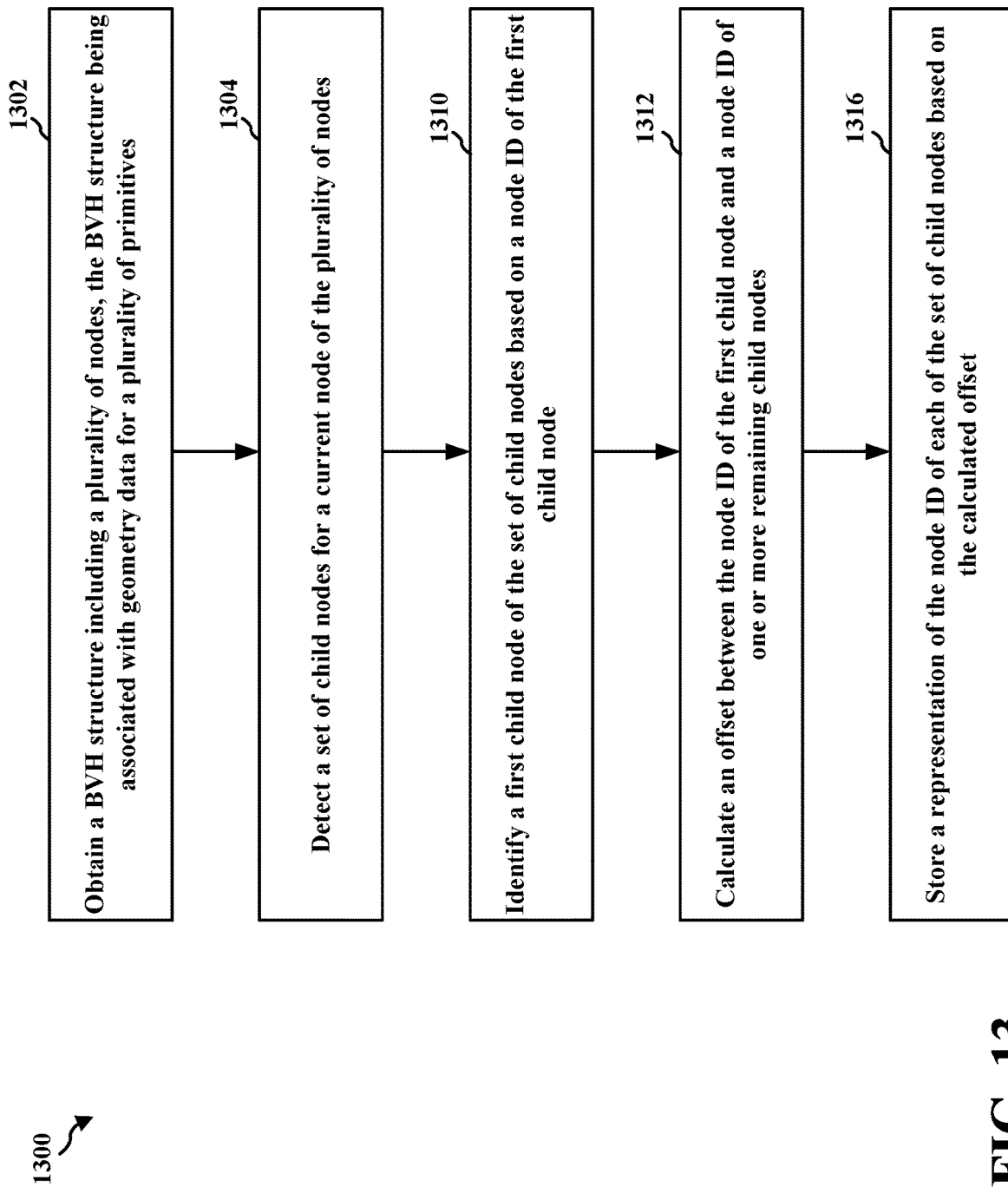
FIG. 13 is a flowchart of an example method of graphics processing.

FIG. 13 is a flowchart 1300 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-12. The methods described herein may provide a number of benefits, such as improving resource utilization and/or power savings.

At 1302, the GPU may obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID), as described in connection with the examples in FIGS. 1-12. For example, as described in 1210 of FIG. 12, GPU component 1202 may obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). Further, step 1302 may be performed by processing unit 120 in FIG. 1. The BVH structure may include a plurality of levels such that each of the plurality of levels includes at least one node of the plurality of nodes.

At 1304, the GPU may detect a set of child nodes for a current node of the plurality of nodes, each of the set of child nodes being intersected by a current ray from a ray tracing process for the current node, each of the set of child nodes including a node ID, as described in connection with the examples in FIGS. 1-12. For example, as described in 1220 of FIG. 12, GPU component 1202 may detect a set of child nodes for a current node of the plurality of nodes, each of the set of child nodes being intersected by a current ray from a ray tracing process for the current node, each of the set of child nodes including a node ID. Further, step 1304 may be performed by processing unit 120 in FIG. 1. The node ID for each of the set of child nodes may be based on the node ID for the current node. The set of child nodes may be equal to 8 child nodes, and the node ID for each of the set of child nodes may be equal to 32 bits. The ray tracing process for the current node may include a plurality of rays, where the current ray is included in the plurality of rays.

At 1310, the GPU may identify a first child node of the set of child nodes based on a node ID of the first child node, as described in connection with the examples in FIGS. 1-12. For example, as described in 1250 of FIG. 12, GPU component 1202 may identify a first child node of the set of child nodes based on a node ID of the first child node. Further, step 1310 may be performed by processing unit 120 in FIG. 1. In some aspects, a node ID of a closest child node to the first child node may be calculated based on the node ID of the first child node and a bitmask for an amount of shift for each of the one or more remaining child nodes.

At 1312, the GPU may calculate an offset between the node ID of the first child node and a node ID of each of one or more remaining child nodes in the set of child nodes, the one or more remaining child nodes including each of the set of child nodes except the first child node, as described in connection with the examples in FIGS. 1-12. For example, as described in 1260 of FIG. 12, GPU component 1202 may calculate an offset between the node ID of the first child node and a node ID of each of one or more remaining child nodes in the set of child nodes, the one or more remaining child nodes including each of the set of child nodes except the first child node. Further, step 1312 may be performed by processing unit 120 in FIG. 1. In some aspects, calculating the offset between the node ID of the first child node and the node ID of each of the one or more remaining child nodes may further include compressing the node ID of the first child node and the node ID of each of the one or more remaining child nodes. Also, calculating the offset between the node ID of the first child node and the node ID of each of the one or more remaining child nodes may further include shifting the representation of the node ID of each of the one or more remaining child nodes. Shifting the representation of the node ID of each of the one or more remaining child nodes may include shifting at least one bit of a stack entry for the node ID of each of the one or more remaining child nodes. The offset between the node ID of the first child node and the node ID of each of the one or more remaining child nodes may be a compressed offset.

At 1316, the GPU may store a representation of the node ID of each of the set of child nodes based on the calculated offset between the node ID of the first child node and the node ID of each of the one or more remaining child nodes, as described in connection with the examples in FIGS. 1-12. For example, as described in 1280 of FIG. 12, GPU component 1202 may store a representation of the node ID of each of the set of child nodes based on the calculated offset between the node ID of the first child node and the node ID of each of the one or more remaining child nodes. Further, step 1316 may be performed by processing unit 120 in FIG. 1.

Figure 14:
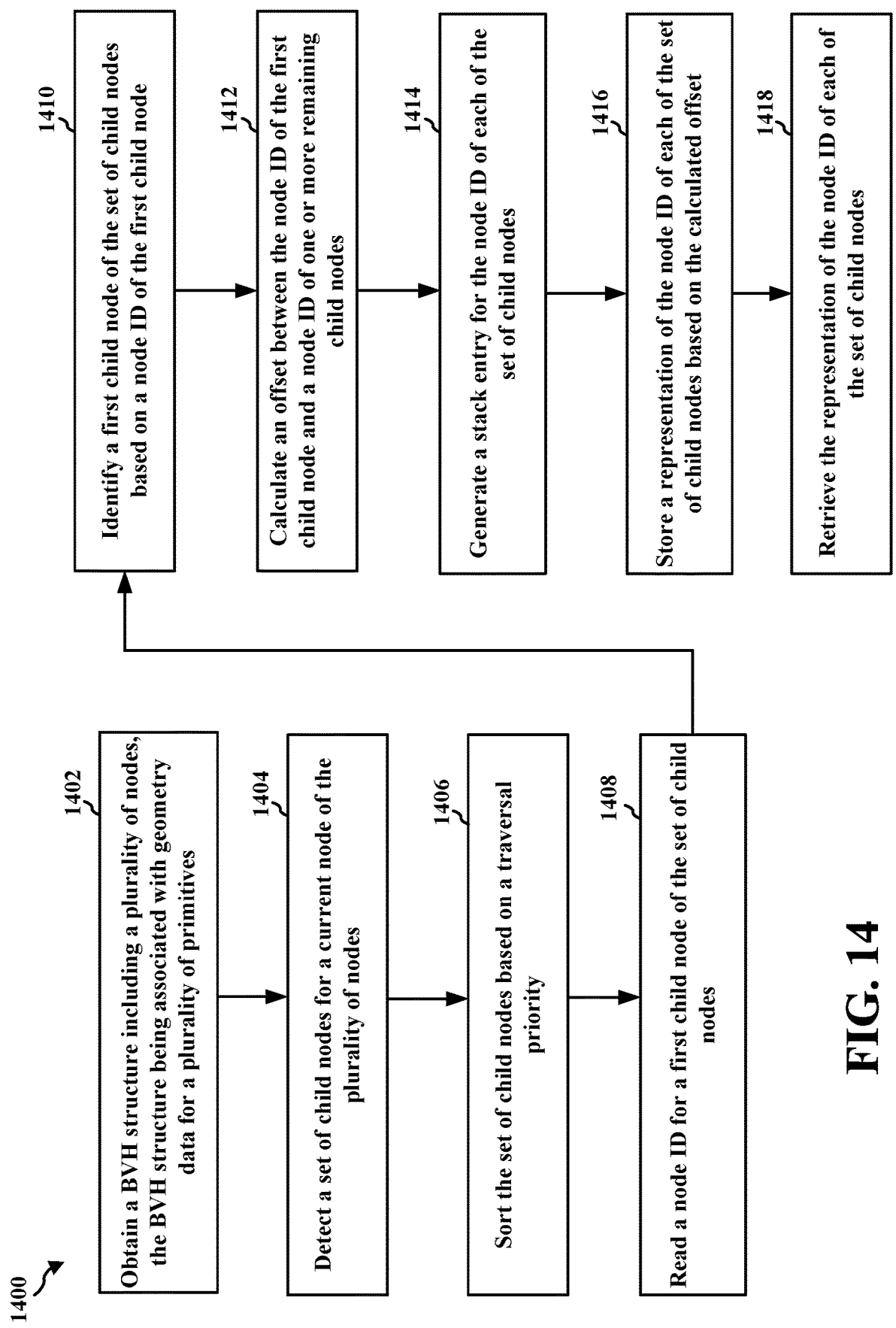
FIG. 14 is a flowchart of an example method of graphics processing.

FIG. 14 is a flowchart 1400 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-12. The methods described herein may provide a number of benefits, such as improving resource utilization and/or power savings.

At 1402, the GPU may obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID), as described in connection with the examples in FIGS. 1-12. For example, as described in 1210 of FIG. 12, GPU component 1202 may obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). Further, step 1402 may be performed by processing unit 120 in FIG. 1. The BVH structure may include a plurality of levels such that each of the plurality of levels includes at least one node of the plurality of nodes.

At 1404, the GPU may detect a set of child nodes for a current node of the plurality of nodes, each of the set of child nodes being intersected by a current ray from a ray tracing process for the current node, each of the set of child nodes including a node ID, as described in connection with the examples in FIGS. 1-12. For example, as described in 1220 of FIG. 12, GPU component 1202 may detect a set of child nodes for a current node of the plurality of nodes, each of the set of child nodes being intersected by a current ray from a ray tracing process for the current node, each of the set of child nodes including a node ID. Further, step 1404 may be performed by processing unit 120 in FIG. 1. The node ID for each of the set of child nodes may be based on the node ID for the current node. The set of child nodes may be equal to 8 child nodes, and the node ID for each of the set of child nodes may be equal to 32 bits. The ray tracing process for the current node may include a plurality of rays, where the current ray is included in the plurality of rays.

At 1406, the GPU may sort the set of child nodes for the current node based on a traversal priority of the set of child nodes, where the first child node is identified based on the traversal priority of the set of child nodes, as described in connection with the examples in FIGS. 1-12. For example, as described in 1230 of FIG. 12, GPU component 1202 may sort the set of child nodes for the current node based on a traversal priority of the set of child nodes, where the first child node is identified based on the traversal priority of the set of child nodes. Further, step 1406 may be performed by processing unit 120 in FIG. 1.

At 1408, the GPU may read the node ID for the first child node of the set of child nodes, where the first child node is identified based on reading the node ID for the first child node, as described in connection with the examples in FIGS. 1-12. For example, as described in 1240 of FIG. 12, GPU component 1202 may read the node ID for the first child node of the set of child nodes, where the first child node is identified based on reading the node ID for the first child node. Further, step 1408 may be performed by processing unit 120 in FIG. 1.

At 1410, the GPU may identify a first child node of the set of child nodes based on a node ID of the first child node, as described in connection with the examples in FIGS. 1-12. For example, as described in 1250 of FIG. 12, GPU component 1202 may identify a first child node of the set of child nodes based on a node ID of the first child node. Further, step 1410 may be performed by processing unit 120 in FIG. 1. In some aspects, a node ID of a closest child node to the first child node may be calculated based on the node ID of the first child node and a bitmask for an amount of shift for each of the one or more remaining child nodes.

At 1412, the GPU may calculate an offset between the node ID of the first child node and a node ID of each of one or more remaining child nodes in the set of child nodes, the one or more remaining child nodes including each of the set of child nodes except the first child node, as described in connection with the examples in FIGS. 1-12. For example, as described in 1260 of FIG. 12, GPU component 1202 may calculate an offset between the node ID of the first child node and a node ID of each of one or more remaining child nodes in the set of child nodes, the one or more remaining child nodes including each of the set of child nodes except the first child node. Further, step 1412 may be performed by processing unit 120 in FIG. 1. In some aspects, calculating the offset between the node ID of the first child node and the node ID of each of the one or more remaining child nodes may further include compressing the node ID of the first child node and the node ID of each of the one or more remaining child nodes. Also, calculating the offset between the node ID of the first child node and the node ID of each of the one or more remaining child nodes may further include shifting the representation of the node ID of each of the one or more remaining child nodes. Shifting the representation of the node ID of each of the one or more remaining child nodes may include shifting at least one bit of a stack entry for the node ID of each of the one or more remaining child nodes. The offset between the node ID of the first child node and the node ID of each of the one or more remaining child nodes may be a compressed offset.

At 1414, the GPU may generate a stack entry for the node ID of each of the set of child nodes, where the stack entry for the node ID of each of the set of child nodes is generated prior to being stored, as described in connection with the examples in FIGS. 1-12. For example, as described in 1270 of FIG. 12, GPU component 1202 may generate a stack entry for the node ID of each of the set of child nodes, where the stack entry for the node ID of each of the set of child nodes is generated prior to being stored. Further, step 1414 may be performed by processing unit 120 in FIG. 1. For instance, the representation of the node ID may be a stack entry for the node ID of each of the set of child nodes. Also, the stack entry for the node ID of each of the set of child nodes may be stored in at least one of: a stack, a memory, a cache, or a register.

At 1416, the GPU may store a representation of the node ID of each of the set of child nodes based on the calculated offset between the node ID of the first child node and the node ID of each of the one or more remaining child nodes, as described in connection with the examples in FIGS. 1-12. For example, as described in 1280 of FIG. 12, GPU component 1202 may store a representation of the node ID of each of the set of child nodes based on the calculated offset between the node ID of the first child node and the node ID of each of the one or more remaining child nodes. Further, step 1416 may be performed by processing unit 120 in FIG. 1.

At 1418, the GPU may retrieve the representation of the node ID of each of the set of child nodes after the representation of the node ID of each of the set of child nodes is stored, as described in connection with the examples in FIGS. 1-12. For example, as described in 1290 of FIG. 12, GPU component 1202 may retrieve the representation of the node ID of each of the set of child nodes after the representation of the node ID of each of the set of child nodes is stored. Further, step 1418 may be performed by processing unit 120 in FIG. 1. In some aspects, retrieving the representation of the node ID of each of the set of child nodes may further include decompressing the node ID of each of the set of child nodes. Also, retrieving the representation of the node ID of each of the set of child nodes may further include shifting the representation of the node ID of each of the one or more remaining child nodes, such that the representation of the node ID of each of the one or more remaining child nodes may be shifted back to the representation of the node ID prior to being stored.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for obtaining a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). The apparatus, e.g., processing unit 120, may also include means for detecting a set of child nodes for a current node of the plurality of nodes, each of the set of child nodes being intersected by a current ray from a ray tracing process for the current node, each of the set of child nodes including a node ID. The apparatus, e.g., processing unit 120, may also include means for identifying a first child node of the set of child nodes based on a node ID of the first child node. The apparatus, e.g., processing unit 120, may also include means for calculating an offset between the node ID of the first child node and a node ID of each of one or more remaining child nodes in the set of child nodes, the one or more remaining child nodes including each of the set of child nodes except the first child node. The apparatus, e.g., processing unit 120, may also include means for storing a representation of the node ID of each of the set of child nodes based on the calculated offset between the node ID of the first child node and the node ID of each of the one or more remaining child nodes. The apparatus, e.g., processing unit 120, may also include means for sorting the set of child nodes for the current node based on a traversal priority of the set of child nodes, where the first child node is identified based on the traversal priority of the set of child nodes. The apparatus, e.g., processing unit 120, may also include means for reading the node ID for the first child node of the set of child nodes, where the first child node is identified based on reading the node ID for the first child node. The apparatus, e.g., processing unit 120, may also include means for generating the stack entry for the node ID of each of the set of child nodes, where the stack entry for the node ID of each of the set of child nodes is generated prior to being stored. The apparatus, e.g., processing unit 120, may also include means for retrieving the representation of the node ID of each of the set of child nodes after the representation of the node ID of each of the set of child nodes is stored.

The subject matter described herein may be implemented to realize one or more benefits or advantages. For instance, the described graphics processing techniques may be used by a GPU, a graphics processor, or some other processor that may perform graphics processing to implement the compressed traversal stack techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize compressed traversal stack techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to: obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID); detect a set of child nodes for a current node of the plurality of nodes, each of the set of child nodes being intersected by a current ray from a ray tracing process for the current node, each of the set of child nodes including a node ID; identify a first child node of the set of child nodes based on a node ID of the first child node; calculate an offset between the node ID of the first child node and a node ID of each of one or more remaining child nodes in the set of child nodes, the one or more remaining child nodes including each of the set of child nodes except the first child node; and store a representation of the node ID of each of the set of child nodes based on the calculated offset between the node ID of the first child node and the node ID of each of the one or more remaining child nodes.

Aspect 2 is the apparatus of aspect 1, where to calculate the offset between the node ID of the first child node and the node ID of each of the one or more remaining child nodes, the at least one processor is configured to compress the node ID of the first child node and the node ID of each of the one or more remaining child nodes.

Aspect 3 is the apparatus of any of aspects 1 and 2, where to calculate the offset between the node ID of the first child node and the node ID of each of the one or more remaining child nodes, the at least one processor is configured to shift the representation of the node ID of each of the one or more remaining child nodes.

Aspect 4 is the apparatus of any of aspects 1 to 3, where to shift the representation of the node ID of each of the one or more remaining child nodes, the at least one processor is configured to shift at least one bit of a stack entry for the node ID of each of the one or more remaining child nodes.

Aspect 5 is the apparatus of any of aspects 1 to 4, where the at least one processor is further configured to: sort the set of child nodes for the current node based on a traversal priority of the set of child nodes, where the first child node is identified based on the traversal priority of the set of child nodes.

Aspect 6 is the apparatus of any of aspects 1 to 5, where the at least one processor is further configured to: read the node ID for the first child node of the set of child nodes, where the first child node is identified based on reading the node ID for the first child node.

Aspect 7 is the apparatus of any of aspects 1 to 6, where the representation of the node ID is a stack entry for the node ID of each of the set of child nodes.

Aspect 8 is the apparatus of any of aspects 1 to 7, where the at least one processor is further configured to: generate the stack entry for the node ID of each of the set of child nodes, where the stack entry for the node ID of each of the set of child nodes is generated prior to being stored.

Aspect 9 is the apparatus of any of aspects 1 to 8, where the stack entry for the node ID of each of the set of child nodes is stored in at least one of: a stack, a first memory, a cache, or a register.

Aspect 10 is the apparatus of any of aspects 1 to 9, where the at least one processor is further configured to: retrieve the representation of the node ID of each of the set of child nodes after the representation of the node ID of each of the set of child nodes is stored.

Aspect 11 is the apparatus of any of aspects 1 to 10, where to retrieve the representation of the node ID of each of the set of child nodes, the at least one processor is configured to decompress the node ID of each of the set of child nodes.

Aspect 12 is the apparatus of any of aspects 1 to 11, where to retrieve the representation of the node ID of each of the set of child nodes, the at least one processor is configured to shift the representation of the node ID of each of the one or more remaining child nodes, such that the representation of the node ID of each of the one or more remaining child nodes is shifted back to the representation of the node ID prior to being stored.

Aspect 13 is the apparatus of any of aspects 1 to 12, where a node ID of a closest child node to the first child node is calculated based on the node ID of the first child node and a bitmask for an amount of shift for each of the one or more remaining child nodes.

Aspect 14 is the apparatus of any of aspects 1 to 13, where the offset between the node ID of the first child node and the node ID of each of the one or more remaining child nodes is a compressed offset.

Aspect 15 is the apparatus of any of aspects 1 to 14, where the node ID for each of the set of child nodes is based on the node ID for the current node.

Aspect 16 is the apparatus of any of aspects 1 to 15, where the set of child nodes is equal to 8 child nodes, and the node ID for each of the set of child nodes is equal to 32 bits.

Aspect 17 is the apparatus of any of aspects 1 to 16, where the ray tracing process for the current node includes a plurality of rays, where the current ray is included in the plurality of rays.

Aspect 18 is the apparatus of any of aspects 1 to 17, where the BVH structure includes a plurality of levels such that each of the plurality of levels includes at least one node of the plurality of nodes.

Aspect 19 is the apparatus of any of aspects 1 to 18, where the apparatus is a wireless communication device, further including at least one of an antenna or a transceiver coupled to the at least one processor.

Aspect 20 is a method of graphics processing for implementing any of aspects 1 to 19.

Aspect 21 is an apparatus for graphics processing including means for implementing any of aspects 1 to 19.

Aspect 22 is a non-transitory computer-readable medium storing computer executable code, the code when executed by at least one processor causes the at least one processor to implement any of aspects 1 to 19.

What is claimed is:

1. An apparatus for graphics processing, comprising:
   memory; and
   at least one processor coupled to the memory and configured to:
      obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID);
      detect a set of child nodes for a current node of the plurality of nodes, each of the set of child nodes being intersected by a current ray from a ray tracing process for the current node, each of the set of child nodes including a node ID;
      identify a first child node of the set of child nodes based on a node ID of the first child node;
      calculate an offset between the node ID of the first child node and a node ID of each of one or more remaining child nodes in the set of child nodes, the one or more remaining child nodes including each of the set of child nodes except the first child node, wherein to calculate the offset between the node ID of the first child node and the node ID of each of the one or more remaining child nodes, the at least one processor is configured to compress the node ID of the first child node and the node ID of each of the one or more remaining child nodes;
      generate a stack entry for the node ID of each of the set of child nodes, wherein the stack entry for the node ID of each of the set of child nodes is generated prior to being stored, wherein the node ID of each of the set of child nodes from each level in the BVH structure is compressed in the stack entry prior to being stored; and
      store a representation of the node ID of each of the set of child nodes based on the calculated offset between the node ID of the first child node and the node ID of each of the one or more remaining child nodes, wherein the representation of the node ID is the stack entry for the node ID of each of the set of child nodes, wherein the stack entry for the node ID of each of the set of child nodes is stored in a sorted order based on a traversal priority of the set of child nodes.

2. The apparatus of claim 1, wherein to calculate the offset between the node ID of the first child node and the node ID of each of the one or more remaining child nodes, the at least one processor is configured to: shift the representation of the node ID of each of the one or more remaining child nodes.

3. The apparatus of claim 2, wherein to shift the representation of the node ID of each of the one or more remaining child nodes, the at least one processor is configured to: shift at least one bit of a stack entry for the node ID of each of the one or more remaining child nodes.

4. The apparatus of claim 1, wherein the at least one processor is further configured to:
sort the set of child nodes for the current node based on the traversal priority of the set of child nodes, wherein the first child node is identified based on the traversal priority of the set of child nodes.

5. The apparatus of claim 1, wherein the at least one processor is further configured to:
read the node ID for the first child node of the set of child nodes, wherein the first child node is identified based on reading the node ID for the first child node.

6. The apparatus of claim 1, wherein the stack entry for the node ID of each of the set of child nodes is stored in at least one of: the stack, a first memory, a cache, or a register.

7. The apparatus of claim 1, wherein the at least one processor is further configured to:
retrieve the representation of the node ID of each of the set of child nodes after the representation of the node ID of each of the set of child nodes is stored.

8. The apparatus of claim 7, wherein to retrieve the representation of the node ID of each of the set of child nodes, the at least one processor is configured to: decompress the node ID of each of the set of child nodes.

9. The apparatus of claim 7, wherein to retrieve the representation of the node ID of each of the set of child nodes, the at least one processor is configured to: shift the representation of the node ID of each of the one or more remaining child nodes, such that the representation of the node ID of each of the one or more remaining child nodes is shifted back to the representation of the node ID prior to being stored.

10. The apparatus of claim 1, wherein a node ID of a closest child node to the first child node is calculated based on the node ID of the first child node and a bitmask for an amount of shift for each of the one or more remaining child nodes.

11. The apparatus of claim 1, wherein the offset between the node ID of the first child node and the node ID of each of the one or more remaining child nodes is a compressed offset.

12. The apparatus of claim 1, wherein the node ID for each of the set of child nodes is based on the node ID for the current node.

13. The apparatus of claim 1, wherein the ray tracing process for the current node includes a plurality of rays, wherein the current ray is included in the plurality of rays.

14. The apparatus of claim 1, wherein the BVH structure includes a plurality of levels such that each of the plurality of levels includes at least one node of the plurality of nodes.

15. The apparatus of claim 1, wherein the apparatus is a wireless communication device, further comprising at least one of an antenna or a transceiver coupled to the at least one processor.

16. A method of graphics processing, comprising:
obtaining a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID);
detecting a set of child nodes for a current node of the plurality of nodes, each of the set of child nodes being intersected by a current ray from a ray tracing process for the current node, each of the set of child nodes including a node ID;
identifying a first child node of the set of child nodes based on a node ID of the first child node;
calculating an offset between the node ID of the first child node and a node ID of each of one or more remaining child nodes in the set of child nodes, the one or more remaining child nodes including each of the set of child nodes except the first child node, wherein calculating the offset between the node ID of the first child node and the node ID of each of the one or more remaining child nodes comprises compressing the node ID of the first child node and the node ID of each of the one or more remaining child nodes;
generating a stack entry for the node ID of each of the set of child nodes, wherein the stack entry for the node ID of each of the set of child nodes is generated prior to being stored, wherein the node ID of each of the set of child nodes from each level in the BVH structure is compressed in the stack entry prior to being stored; and
storing a representation of the node ID of each of the set of child nodes based on the calculated offset between the node ID of the first child node and the node ID of each of the one or more remaining child nodes, wherein the representation of the node ID is the stack entry for the node ID of each of the set of child nodes, wherein the stack entry for the node ID of each of the set of child nodes is stored in a sorted order based on a traversal priority of the set of child nodes.

17. The method of claim 16, wherein calculating the offset between the node ID of the first child node and the node ID of each of the one or more remaining child nodes further comprises shifting the representation of the node ID of each of the one or more remaining child nodes; wherein shifting the representation of the node ID of each of the one or more remaining child nodes comprises shifting at least one bit of a stack entry for the node ID of each of the one or more remaining child nodes.

18. The method of claim 16, further comprising:
sorting the set of child nodes for the current node based on the traversal priority of the set of child nodes, wherein the first child node is identified based on the traversal priority of the set of child nodes.

19. The method of claim 16, further comprising:
reading the node ID for the first child node of the set of child nodes, wherein the first child node is identified based on reading the node ID for the first child node.

20. The method of claim 16, wherein the stack entry for the node ID of each of the set of child nodes is stored in at least one of: the stack, a memory, a cache, or a register.

21. The method of claim 16, further comprising:
retrieving the representation of the node ID of each of the set of child nodes after the representation of the node ID of each of the set of child nodes is stored, wherein retrieving the representation of the node ID of each of the set of child nodes further comprises:
decompressing the node ID of each of the set of child nodes; and
shifting the representation of the node ID of each of the one or more remaining child nodes, such that the representation of the node ID of each of the one or more remaining child nodes is shifted back to the representation of the node ID prior to being stored.

22. The method of claim 16, wherein a node ID of a closest child node to the first child node is calculated based on the node ID of the first child node and a bitmask for an amount of shift for each of the one or more remaining child nodes.

23. The method of claim 16, wherein the offset between the node ID of the first child node and the node ID of each of the one or more remaining child nodes is a compressed offset, and wherein the node ID for each of the set of child nodes is based on the node ID for the current node.

24. An apparatus for graphics processing, comprising:
means for obtaining a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID);
means for detecting a set of child nodes for a current node of the plurality of nodes, each of the set of child nodes being intersected by a current ray from a ray tracing process for the current node, each of the set of child nodes including a node ID;
means for identifying a first child node of the set of child nodes based on a node ID of the first child node;
means for calculating an offset between the node ID of the first child node and a node ID of each of one or more remaining child nodes in the set of child nodes, the one or more remaining child nodes including each of the set of child nodes except the first child node, wherein the means for calculating the offset between the node ID of the first child node and the node ID of each of the one or more remaining child nodes is configured to compress the node ID of the first child node and the node ID of each of the one or more remaining child nodes;
means for generating a stack entry for the node ID of each of the set of child nodes, wherein the stack entry for the node ID of each of the set of child nodes is generated prior to being stored, wherein the node ID of each of the set of child nodes from each level in the BVH structure is compressed in the stack entry prior to being stored; and
means for storing a representation of the node ID of each of the set of child nodes based on the calculated offset between the node ID of the first child node and the node ID of each of the one or more remaining child nodes, wherein the representation of the node ID is the stack entry for the node ID of each of the set of child nodes, wherein the stack entry for the node ID of each of the set of child nodes is stored in a sorted order based on a traversal priority of the set of child nodes.

25. A non-transitory computer-readable medium storing computer executable code for graphics processing, the code when executed by a processor causes the processor to:
obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID);
detect a set of child nodes for a current node of the plurality of nodes, each of the set of child nodes being intersected by a current ray from a ray tracing process for the current node, each of the set of child nodes including a node ID;
identify a first child node of the set of child nodes based on a node ID of the first child node;
calculate an offset between the node ID of the first child node and a node ID of each of one or more remaining child nodes in the set of child nodes, the one or more remaining child nodes including each of the set of child nodes except the first child node, wherein to calculate the offset between the node ID of the first child node and the node ID of each of the one or more remaining child nodes, the code when executed by the processor causes the processor to compress the node ID of the first child node and the node ID of each of the one or more remaining child nodes;
generate a stack entry for the node ID of each of the set of child nodes, wherein the stack entry for the node ID of each of the set of child nodes is generated prior to being stored, wherein the node ID of each of the set of child nodes from each level in the BVH structure is compressed in the stack entry prior to being stored; and
store a representation of the node ID of each of the set of child nodes based on the calculated offset between the node ID of the first child node and the node ID of each of the one or more remaining child nodes, wherein the representation of the node ID is the stack entry for the node ID of each of the set of child nodes, wherein the stack entry for the node ID of each of the set of child nodes is stored in a sorted order based on a traversal priority of the set of child nodes.

26. The apparatus of claim 1, wherein the set of child nodes is equal to 8 child nodes and the node ID for each of the set of child nodes is equal to 32 bits, and wherein the stack entry is 64 bits.

27. The method of claim 16, wherein the set of child nodes is equal to 8 child nodes and the node ID for each of the set of child nodes is equal to 32 bits, and wherein the stack entry is 64 bits.

* * * * *